(12) United States Patent
Ekdahl et al.

(10) Patent No.: US 11,916,923 B2
(45) Date of Patent: Feb. 27, 2024

(54) METHOD FOR RESTRICTING MEMORY WRITE ACCESS IN IoT DEVICES

(71) Applicant: Telefonaktiebolaget LM Ericsson (publ), Stockholm (SE)

(72) Inventors: Patrik Ekdahl, Dalby (SE); Magnus Åström, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 104 days.

(21) Appl. No.: 16/956,652

(22) PCT Filed: Dec. 22, 2017

(86) PCT No.: PCT/EP2017/084534
§ 371 (c)(1),
(2) Date: Jun. 22, 2020

(87) PCT Pub. No.: WO2019/120586
PCT Pub. Date: Jun. 27, 2019

(65) Prior Publication Data
US 2020/0412742 A1 Dec. 31, 2020

(51) Int. Cl.
*H04L 9/40* (2022.01)
*G06F 21/12* (2013.01)
(Continued)

(52) U.S. Cl.
CPC .......... *H04L 63/123* (2013.01); *G06F 21/121* (2013.01); *G06F 21/51* (2013.01);
(Continued)

(58) Field of Classification Search
CPC ............... H04L 63/123; H04L 63/1416; H04L 63/1466; H04L 63/162; G06F 21/121; G06F 21/51; G06F 21/57
See application file for complete search history.

(56) References Cited

U.S. PATENT DOCUMENTS 8,464,347 B2 * 6/2013 Maeda ............... G06F 21/57
380/278
2008/0244553 A1 10/2008 Cromer et al.
(Continued)

FOREIGN PATENT DOCUMENTS

CN 103891332 A 6/2014
CN 106506595 A 3/2017

OTHER PUBLICATIONS

Arup, et al. "Mobility management in wireless ATM networks." Nov. 1997. IEEE Communications Magazine 35.11 p. 100-109 (Year: 1997).*
(Continued)

*Primary Examiner* — Peter C Shaw
*Assistant Examiner* — Zhe Liu
(74) *Attorney, Agent, or Firm* — Christopher & Weisberg, P.A.

(57) ABSTRACT

Disclosed herein is a method of a communication device, wherein the communication device is configured to operate in connection with an access node associated with a wireless communication network. The method comprises receiving a first data packet comprising a write request for writing code and/or data to a non-volatile memory comprised in the communication device and determining whether a second data packet comprising an identifier associated with the first data packet is received. When it is determined that the second data packet comprising the identifier is received, the method comprises extracting the identifier from the second data packet, wherein the identifier is a radio access layer parameter, determining whether the identifier is trusted, determining whether the identifier is validated when it is determined that the identifier is trusted and accepting at least a subset of the write request when it is determined that the identifier is trusted and validated. Also disclosed is an arrangement of a communication device, method and
(Continued)

arrangement of an access node and, a communication device, an access node and computer program product.

9 Claims, 2 Drawing Sheets

(51) Int. Cl.
- *G06F 21/51* (2013.01)
- *G06F 21/57* (2013.01)
- *H04W 12/64* (2021.01)
- *H04W 12/63* (2021.01)

(52) U.S. Cl.
CPC .......... *G06F 21/57* (2013.01); *H04L 63/1416* (2013.01); *H04L 63/1466* (2013.01); *H04L 63/162* (2013.01); *H04W 12/63* (2021.01); *H04W 12/64* (2021.01)

(56) References Cited

U.S. PATENT DOCUMENTS

| | | | |
|---|---|---|---|
| 2012/0102465 A1* | 4/2012 | Bates | H04L 67/10 717/124 |
| 2012/0254857 A1* | 10/2012 | Doraiswamy | G06F 8/61 717/177 |
| 2013/0040603 A1 | 2/2013 | Stahlberg et al. | |
| 2013/0109323 A1* | 5/2013 | Ruutu | H04W 52/0225 455/68 |
| 2013/0232229 A1* | 9/2013 | Firman | G06F 8/61 709/219 |
| 2013/0344844 A1* | 12/2013 | Goldfarb | H04W 12/125 455/411 |
| 2014/0004825 A1 | 1/2014 | Prakash et al. | |
| 2014/0068585 A1* | 3/2014 | Young | G06F 21/572 717/168 |
| 2014/0068778 A1 | 3/2014 | Bhatia et al. | |
| 2014/0254598 A1* | 9/2014 | Jha | H04L 45/74 370/392 |
| 2015/0160948 A1* | 6/2015 | Marr | G06F 9/4416 709/221 |
| 2016/0036814 A1* | 2/2016 | Conrad | H04L 9/0891 713/171 |
| 2016/0036956 A1* | 2/2016 | Debates | G06F 16/951 455/419 |
| 2016/0149930 A1* | 5/2016 | Casaburi | H04L 63/1425 726/1 |
| 2017/0078322 A1* | 3/2017 | Seiver | H04L 63/1416 |
| 2017/0099604 A1* | 4/2017 | Raleigh | H04L 41/046 |
| 2017/0127373 A1* | 5/2017 | Deshpande | H04W 64/003 |
| 2017/0141968 A1* | 5/2017 | Lloyd | H04L 67/55 |
| 2017/0185418 A1* | 6/2017 | Huang | G06F 8/63 |
| 2017/0302761 A1* | 10/2017 | Devitt-Carolan | H04L 67/01 |
| 2018/0167380 A1* | 6/2018 | Debickes | H04W 12/08 |
| 2018/0365449 A1* | 12/2018 | Meriac | G06F 21/74 |
| 2018/0375867 A1* | 12/2018 | Isola | H04L 63/101 |
| 2019/0132787 A1* | 5/2019 | Ryan | G06K 9/6223 |

OTHER PUBLICATIONS

Hong, Sung-Hyuck. "Secure MAC address-based Authentication on x.509 v3 Certificate in Group Communication." Journal of Internet Computing and Services 9.4. Feb. 4, 2008. p. 69-77. (Year: 2008).*

Cong, Xinri. "Wireless ATM—an Overview." Washington University in St. Lewis. Feb. 25, 2006. Retrieved from the Internet:<URL:https://web.archive.org/web/20060225044601/http://www.cse.wustl.edu/~jain/cis788-97/ftp/wireless_atm/index.htm>(Year: 2006).*

Chinese Office Action with English Summary Translation dated Feb. 8, 2022 for Patent Application No. 201780097916.5, consisting of 24-pages.

EPO Communication dated Dec. 17, 2021 for Patent Application No. 17826524.5, consisting of 7-pages.

Chinese Office Action with English Language Summary Translation dated Oct. 8, 2022 for Patent Application No. 201780097916.5, consisting of 19-pages.

* cited by examiner

METHOD FOR RESTRICTING MEMORY WRITE ACCESS IN IoT DEVICES

TECHNICAL FIELD

The present invention relates generally to the field of wireless communication. More particularly, it relates to handling of communication devices in wireless communication networks.

BACKGROUND

The current vision about machine type communication (IoT, Internet of things) devices typically predicts that 26 billion devices will be connected to internet (internet of things) by 2020. The devices may typically be ranging from consumers of huge bandwidth down to sensors, actuators and meters operating on battery, solar and/or wind power and sparsely reporting parameters such as environmental parameters (e.g. temperature, carbon dioxide levels, wind and water flow, lighting conditions), consumption (e.g. gas, power, water; utilization of finite resources), utilization (e.g. volume treated by an air pollution filter, volume treated by a water filter or treatment device), machine operation time for machine including moving parts e.g. ball bearings and sprockets); or controlling (directly or indirectly) environmental variables (e.g. ventilation, lighting, temperature) or operation (water treatment, air pollution treatment), to mention a few examples.

A majority of the IoT devices may typically be wirelessly connected to the Internet and will typically be stationary and only transmit a small amount of data sparsely in time and hence may have battery life length of up to several years. For such applications several different cellular standards have been defined, for instance NB-IoT (narrow band IoT), eMTC (enhanced machine type communication, low power MTC version of LTE, long term evolution), Sigfox, LoRa (low range low power) to mention a few.

Many IoT devices' life length is typically planned to be around 10 years. Hence SW (software) updates or additional SW installations on the application layer or firmware updates might be needed for correct functionality and keeping the device functionality up to date. Furthermore, the functionality of the device may be different depending on geographical position, and hence the SW update (or another reconfiguration) may be different depending on the different geographical positions of the device.

Many of the IoT devices may typically be running low-power processors incapable of supporting sophisticated security. Furthermore, embedded IoT devices may possibly continue to operate for years after their last software patch, and may even outlive the demise of their manufacturer. Hence they may therefore be an easy target for possible hacker attacks. For instance, there is a potential use of distributed denial of service (ddos) attacks using IoT devices to disrupt critical infrastructure, including for instance cellular communication systems.

One approach to hack an IoT device is typically to reconfigure the device with malicious SW. The fake SW may for instance introduce erroneous functionality to the IoT device with regard to the geographical position and hence it's intendent use.

Furthermore, the risk for "man-in-the-middle" attacks with regard to reconfiguration requests may be different depending on the Radio Access Technology used for the connection between the IoT device and the serving/camping AP/NW node.

Typical current strategies for avoiding remote erroneous reconfiguration of IoT devices are typically based on authorization on the "application layer" and are hence transparent to the radio access layer (i.e. authorization independent of the radio access layer). However, there typically are several short comings with such an approach, for instance it is not possible to utilize cellular radio access authorization/certification methods for verification and it is typically not possible to utilize the spatial information inherent in stationary AP/NW nodes for IoT device position verification.

Hence, there is a need for methods, arrangements and computer program products for verification of non-volatile memory write requests for IoT devices. Preferably, such approaches provide for forming of a higher security functionality for verification of non-volatile memory write requests than what typically is possible today.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to at least mitigate and/or alleviate at least some of the above disadvantages and to provide methods and arrangements of a communication device and an access node for restricting memory write access to IoT devices.

According to a first aspect this is achieved by a method of a communication device. The communication device is configured to operate in connection with an access node associated with a wireless communication network.

The communication device may in some embodiments be a wireless communication device. In some embodiments, the communication device is a wireless IoT-device.

The access node may in some embodiments be a network node, any type of access point (AP), a base station, an evolved Node B (eNB), a remote server, a network cell, etc.

The method comprises receiving a first data packet comprising a write request for writing code and/or data to a non-volatile memory comprised in the communication device and determining whether a second data packet comprising an identifier associated with the first data packet is received. When it is determined that the second data packet comprising the identifier is received, the method comprises extracting the identifier from the second data packet, wherein the identifier is a radio access layer parameter, determining whether the identifier is trusted, determining whether the identifier is validated, when it is determined that the identifier is trusted, and accepting at least a subset of the write request when it is determined that the identifier is trusted and validated.

In some embodiments, the identifier is a global or local identity related to a supported Radio access network (RAN) or cell/access point (AP)/beam identity.

In some embodiments, the identifier is associated with at least one of a serving cell, a camping cell, an access point and a network node.

The association may e.g. tie the identifier to a physical location. This may be realised e.g. by means of a database, e.g. by mapping Cell ID to location and storing matrixes or lists in the database over cell IDs and their location. The database may be locally available to the communication device or available to the device by means of e.g. the network cloud (or access node or remote server, etc.).

In some embodiments, the identifier may simply comprise a GPS location. For instance, the GPS location may have been obtained from e.g. GPS, and the communication device may in some embodiments comprise a GPS on its own in order to find and verify the location.

Hence the identifier may be associated with a certain position or location (the terms may be used interchangeably in this disclosure).

In some embodiments, the first data packet and second data packet is received simultaneously in one data packet.

Hence the first and second data packet may in some embodiments be received as separate data packets, or they may be received as a single data packet. In some embodiments, the second data packet may be received prior to the first data packet.

In some embodiments, the first data packet and the second data packet may be transmitted by different network entities (the first packet may e.g. be transmitted by a remote server and the second data packet may be transmitted by a network. In some embodiments, the first data packet and the second data packet may be transmitted by the same network entity.

In some embodiments, determining whether the identifier is trusted comprises determining whether the identifier is a signed authentication location message with a valid signature.

In some embodiments, the authentication location message is signed by at least one of the access node, a network node, an access point and a mobile operator core network.

Hence a valid signature may in some embodiments mean that the authentication location message must be associated with some type of network access node, such as an access point, base station, network node etc. If it is not signed by such a network entity it may be an indication that an unauthorized user is trying to add software to the communication device which may possibly be harmful.

In some embodiments, determining whether the identifier is validated comprises determining whether the identifier is comprised in a set of pre-determined identifiers.

In some embodiments, the communication device may have received or may retrieve information from e.g. a remote server or a trusted access node pertaining to which network entities that are considered trusted, i.e. from which entities the communication device may receive updates.

The information may be stored on a data base or in a list internally on the communication device, or in a network cloud.

In some embodiments the method may further comprise determining a current location of the communication device based on the signed authentication location message and determining whether the write request may be accepted in the location associated with the signed authentication location message.

In order to enhance security and reduce the risk of malicious attacks, updates may only be carried out in certain trusted locations. Hence when receiving a write request, the communication device may determine where the write request may be carried out and compare this to the location associated with the signed authentication message. If the location in which the write request only may be carried out in is different from that associated with the signed authentication message, the communication device may not accept the write request.

In the same manner, if a device receives a write request, but finds that it is not present in the location which the write request may be carried out in, it may not perform the update, even if the source of the update is trusted.

In some embodiments, the method may further comprise, when it is determined that the second data packet comprising the identifier associated with the first data packet is not received, determining whether a pre-determined time period has expired since the first data packet was received.

The pre-determined time period may e.g. be set to milliseconds, seconds, minutes, hours, days etc. and may be determined based on security demands in the wireless communication network. E.g. if the purpose of the communication device is important, or that it is critical that it always function as intended, the time period may be set in the shorter range such as milliseconds and seconds.

When it is determined that the pre-determined time period since the first data packet was received has expired, the method may comprise refusing the write request.

As elaborated on above, in some embodiments, the first data packet may further comprise information associated with a location where the write request can be accepted.

This information could also in some embodiments be locally stored on the communication device or be retrieved from a trusted network entity such as a remote server associated with the communication device or an access node.

In some embodiments, the method further comprises determining whether the identifier enables acceptance of at least a sub set of the write request in the location associated with the information comprised in the write request.

It may e.g. be that the write request is substantial and only a part of it may be carried out by the communication device. Depending on the identifier, the communication device may hence determine whether it is allowed to accept the write request fully or only in part.

In some embodiments, the method further comprises performing the determination of whether the identifier is trusted in at least one of a trusted execution environment and a modem processor of the wireless communication device.

The trusted execution environment (TEE) may e.g. be a hardware implementation in e.g. a CPU or other/similar type of controlling circuitry of the communication device, For instance, the determination whether a certain location allows acceptance of a write request or not should preferably not take place directly in e.g. an application processor of the communication device. This since if the application processor is by some means infected with malicious code, the malicious code might directly enable the write operation to the non-volatile memory of the communication device. This leads to that the communication device may receive software which may harm its functions and which could possibly not be easily removed without manual interaction. Instead, the verification should take place in a more confined area, such as the modem processor or a dedicated Trusted Execution Environment, where security is higher.

In some embodiments, the write request comprises a set of memory write parameters.

In some embodiments, the set of memory write parameters is associated with at least one of a software program memory, a firmware program memory, a software configuration memory, and firmware configuration memory.

Hence the write request may comprise software updates for the communication device.

In some embodiments, the identifier may further comprise a connection identifier. The connection identifier is associated with a transmitter of the write request and determining whether the identifier is trusted further comprises determining whether the connection identifier is trusted.

Furthermore as elaborated on above, in some embodiments, the method may comprise determining based on the identifier whether the write request may be accepted in its entirety or whether at least a subset of the write request may be accepted.

In some embodiments, when it is determined that the identifier is not trusted, the method comprises rejecting the write request. In the same manner if it is determined that the identifier is not comprised in the set of pre-determined identifiers, the method may comprise rejecting the write request, even if it determined that the identifier is trusted.

In some embodiments, the method may further comprise reporting the rejection of the write request to at least one of the access node or a remote server node.

If a write request was received but not accepted it may be because it was issued by a possible hacker, and hence the network may be made aware that there is a possible threat.

In some embodiments, the network may be notified that a write request was not accepted for some reason and may have to be issued again at a later instance.

A second aspect is a method of an access node associated with a wireless communication network and configured to operate in connection with a communication device.

The method comprises transmitting a first data packet comprising a write request for writing code to a non-volatile memory comprised in the communication device and transmitting a second data packet within a predetermined time period of transmitting the first data packet. The second data packet comprises an identifier associated with the first data packet, wherein the identifier is a radio access layer parameter.

In some embodiments, the method according to the second aspect may be divided such that the access node performs the steps of sending the second data packet, and a remote server performs the steps of sending the first data packet.

In some embodiments, the method according to the second aspect may be carried out entirely be a remote server or a network node, a base station, an eNB or similar.

A third aspect is an arrangement for a communication device. The communication device is configured to operate in connection with an access node associated with a wireless communication network.

The arrangement comprises a controlling circuitry configured to cause reception of a first data packet comprising a write request for writing code and/or data to a non-volatile memory comprised in the communication device and cause determination of whether a second data packet comprising an identifier associated with the first data packet is received.

When it is determined that the second data packet comprising the identifier is received, the controlling circuitry is further configured to cause extraction of the identifier from the second data packet, wherein the identifier is a radio access layer parameter, determination of whether the identifier is trusted, determination of whether the identifier is validated when the it is determined that the identifier is trusted and acceptance of at least a subset of the write request when it is determined that the identifier is trusted and validated.

A fourth aspect is a communication device comprising the arrangement according to the third aspect.

A fifth aspect is an arrangement of an access node associated with a wireless communication network and configured to operate in connection with a communication device. The arrangement comprises controlling circuitry configured to cause transmittal of a first data packet comprising a write request for writing code to a non-volatile memory comprised in the communication device and transmittal of a second data packet within a predetermined time period of transmitting the first data packet, wherein the second data packet comprises an identifier associated with the first data packet, wherein the identifier is a radio access layer parameter.

A sixth aspect is an access node comprising the arrangement according to the fifth aspect.

A seventh aspect is a computer program product comprising a non-transitory computer readable medium. The non-transitory computer readable medium has stored there on a computer program comprising program instructions. The computer program is configured to be loadable into a data-processing unit, comprising a processor and a memory associated with or integral to the data-processing unit.

When loaded into the data-processing unit, the computer program is configured to be stored in the memory, wherein the computer program, when loaded into and run by the processor is configured to cause the processor to execute method steps according to any of the first or second aspect.

In some embodiments, the second, third, fourth, fifth and sixth aspects may additionally have features identical with or corresponding to any of the various features as explained above for the first aspect.

Furthermore, in some embodiments, any of the above aspects may additionally have features identical with or corresponding to any of the various features as explained above for any of the other aspects.

An advantage of some embodiments is that it is possible to block memory write operations in a restricted memory space, e.g., in an application of firmware program space unless it is ensured that the device is located in a secure area.

Another advantage of some embodiments is communication devices such as IoT-devices will be less susceptible to malicious attacks.

Another advantage of some of the embodiments is that the overall network security is enhanced.

BRIEF DESCRIPTION OF THE DRAWINGS

Further objects, features and advantages will appear from the following detailed description of embodiments, with reference being made to the accompanying drawings, in which.

and

Figure 7:
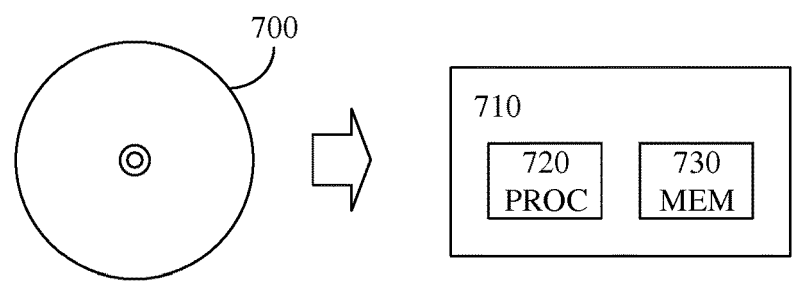

FIG. 7 is a schematic drawing illustrating a computer program product according to some embodiments.

DETAILED DESCRIPTION

In the following, embodiments will be described where security in wireless communication networks are enhanced due to restricted write access in IoT-devices.

In order to achieve this a method according to some embodiments is disclosed for a communication device such as a wireless IoT device for verifying a write request to non-volatile memory address space like an IoT program address space, application software, operating system (or firmware) or configuration address space controlling the execution of the program.

In some embodiments, upon reception of the request, the communication device may determine an identifier of the serving/camping cell/AP/NW node and verify whether the cell/AP/NW node is trusted and/or valid in order to allow for the non-volatile memory write configuration.

Hence according to some embodiments, the IoT device may verify based on a radio access layer parameter whether the reconfiguration should be allowed or denied. Example of such identifiers may be global or local cell ID or RAT used. The verification is then made by comparing the identifier with identifiers in a (in the device) stored data base, over trusted/certified AP/NW nodes.

In some embodiments, the network nodes (e.g. the access nodes) transmit authenticated location messages, signed by the network node. The authenticated location messages may provide the IoT device with a trustworthy location, not easily compromised using a fake base station.

For instance, the network node (e.g. a base station) may e.g. be equipped with a certificate which is more trusted than that of the assumed hacker. As an example, the Root Certificate may be regarded as more trustworthy than an average certificate issued by some kind of pay-and-issue root authority.

In some embodiments, only a subset of the memory area is allowed at a certain access point/NW node.

In some embodiments, the IoT device and the server sending the reconfiguration request may be mutually authenticated to ensure authenticity of the request in addition to the certified/trusted geographical location.

Figure 1:
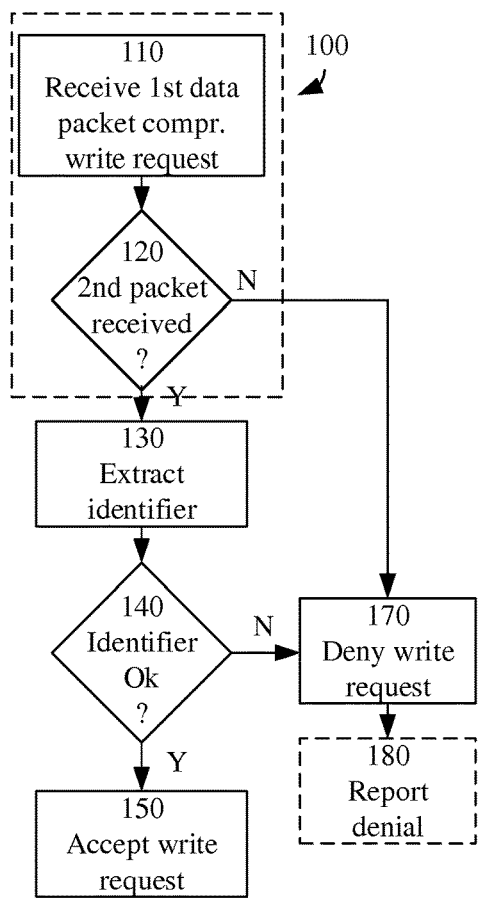
FIG. 1 is a flowchart illustrating example method steps according to some embodiments.

Turning to FIG. 1 a method 100 of a communication device according to some embodiments is described.

The communication device may in some embodiments be a wireless communication device, such as a wireless IoT-device.

E.g. the communication device may be a vehicle, a sensor, a mobile phone, an electronic device embedded with electronics, software, sensors, actuators, and network connectivity which enables the device to connect and exchange data, etc. In some embodiments, the communication may be a wireless communication device. In some embodiments, the communication device may be stationary or mobile.

In some embodiments, the communication device is configured to operate in connection with an access node associated with a wireless communication network.

The access node may e.g. be a network node, a base station, an evolved node B, an access point, a server (local or remote), etc.

The wireless communication network may e.g. be a long term evolution (LTE) communication network, a new radio network, a fifth generation network and may comprise or utilize one or more different radio access networks.

FIG. 1 illustrates the method 100 starting in step 110 with the communication device receiving a first data packet comprising a write request for writing code and/or data to a non-volatile memory comprised in the communication device.

The write request may in some embodiments be received on an application layer of the communication device, or associated with an application layer of the communication device, or associated with a layer above the application layer of the communication device.

Hence the write request may be received on the application layer, or on a layer above the application layer according to some embodiments.

In some embodiments, the write request may comprise a set of memory write parameters. In some embodiments, the set of memory write parameters is associated with at least one of a software program memory, a firmware program memory, a software configuration memory, and firmware configuration memory. Hence the write request may comprise software updates for the communication device.

In step 120 it is determined whether a second data packet comprising an identifier associated with the first data packet is received.

In some embodiments, when it is determined that the second data packet comprising the identifier associated with the first data packet is not received (N-path out of 120) the method may further comprise (step not shown) determining whether a pre-determined time period has expired since the first data packet was received. When it is determined that the pre-determined time period since the first data packet was received has expired, the method may comprises in step 170 refusing (i.e. denying) the write request.

Hence, the wireless communication device may receive the first data packet comprising the write request and may determine if a second packet comprising the identifier which tells the device if the write request has been received within an accepted location has been received within a predetermined time period. If not, it is an indication that the write request may have been issued by an unauthorized entity and hence should not be accepted.

In some embodiments, the first packet may be received before the second packet. In some embodiments, the second packet is received before the first packet. In some embodiments, the first data packet and second data packet is received simultaneously in one data packet (as indicated by the dotted line encompassing steps 110 and 120).

In some embodiments, the predetermined time period may be in the range of milliseconds, seconds, minutes, hours, days etc. The time period may be dynamically set based on sensitivity of the wireless communication network, network topology, geographical parameters etc.

However, when it is determined that the second data packet comprising the identifier is received (Y-path out of 120), the method comprises in step 130 extracting the identifier from the second data packet, wherein the identifier is a radio access layer parameter.

The identifier may e.g. be a global or local identity related to a supported RAN of the wireless network or the access node or related to a network cell/AP/beam identity.

In some embodiments, the identifier may be associated with at least one of a serving cell, a camping cell, an access point and a network node.

Then, the method may continue in 140 where it is determined whether the identifier is trusted and determined whether the identifier is validated when it is determined that the identifier is trusted.

In some embodiments, the method 100 may comprise rejecting the write request immediately when it is determined that the identifier is not trusted.

It should be noted that the transmitter of the first data packet and the transmitter of the second data packet may not necessarily be the same. In some embodiments, the first data packet may e.g. be transmitted by a remote server, and the second data packet may be transmitted by a network node or vice versa.

Furthermore, the communication device may e.g. at some point have received a database or a list comprising valid identifiers. I.e. if the communication device receives a write request which is associated with an identifier being comprised in the data base or list, the device will process that write request.

Furthermore, in some embodiments, determining whether the identifier is trusted may comprise determining whether the identifier is a signed authentication location message with a valid signature.

In some embodiments, the authentication location message may e.g. be signed by at least one of the access node, a network node, an access point and a mobile operator core network.

Hence the identifier may comprise information which ties it to a certain location, e.g. by specifying that a certain write request may only be accepted if it was issued by a certain network entity in a certain location and may furthermore only be performed when the communication device finds itself in that location.

Furthermore, in some embodiments, the method may comprise performing the determination of whether the identifier is trusted in at least one of a trusted execution environment and a modem processor of the wireless communication device.

For example, if geographical verification of the write request is needed it should preferably not take place directly in the application processor of the communication device, since if the application processor is by some means infected with malicious code, the malicious code might directly enable the write operation to the non-volatile memory. Instead, the verification should take place in a more confined area, such as the modem processor or a dedicated Trusted Execution Environment.

In some embodiments, determining whether the identifier is validated may comprise determining whether the identifier is comprised in a set of pre-determined identifiers.

The set of pre-determined identifiers may e.g. have been issued to the communication device from a trusted remote server, or the access node or any other trusted network entity. In some embodiments it may be retrieved by the communication device e.g. from the network cloud, or a server or the access node. The set of pre-determined identifiers may be indicated from what network nodes (such as APs, eNBs, base station access nodes, servers, cells, RANs etc.) the communication device may receive and possibly accept write request and/or updates from.

If in step 140 it is determined that the identifier is trusted and validated (Y-path out of 140) the method may continue in step 150 with accepting at least a subset of the write request when it is determined that the identifier is trusted and validated.

As elaborated on above, the write request may be substantial, and it may be that the communication device may only accept a part of it, while the rest of it is directed to other devices. The write request may e.g. be broadcasted to several communication devices at once, and the identifier may specify what part of the write request that is intended to each communication device, and where it may be accepted.

If in step 140 it is determined that the identifier is not trusted and/or is not validated (N-path out of 140) the method may continue in 170 with rejecting the write request.

The method may then optionally continue in step 180 with the communication device reporting the rejection of the write request to at least one of the access node or a remote server node.

It may e.g. be of value to the wireless network or access node, or remote server to know whether the write request was accepted or not. The communication device may in some embodiments also state for what reason the write request was not accepted. Hence the wireless network may be made aware whether the communication device did not receive a certain update, or if there was a potential attack on the communication device.

In some embodiments, security may be further enhanced by restricting the communication device to only perform certain updates or write requests at special locations (as elaborated on above), no matter of the issuer. For instance, the communication device may receive a write request from an access node, as well as an associated identifier which is present in the set of valid identifiers. However, the first data packet comprising the write request may further comprise information associated with a location where the write request can be accepted. I.e. due to security, there may be a restriction that the update resulting from the write request should only be carried out in a trusted location, e.g. a particular cell tied to a certain access node.

The method may hence further comprise determining a current location communication device based on the signed authentication location message and determining whether the write request may be accepted in the location associated with the signed authentication location message.

Figure 2A:
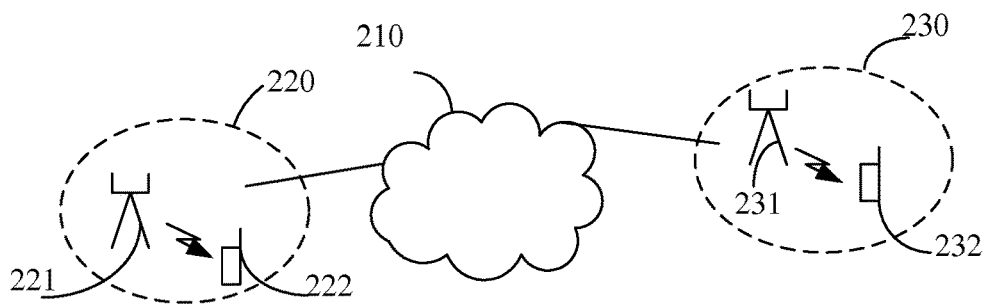
FIGS. 2A-2C are schematic drawings illustrating a network scenario according to some embodiments.
Figure 2B:
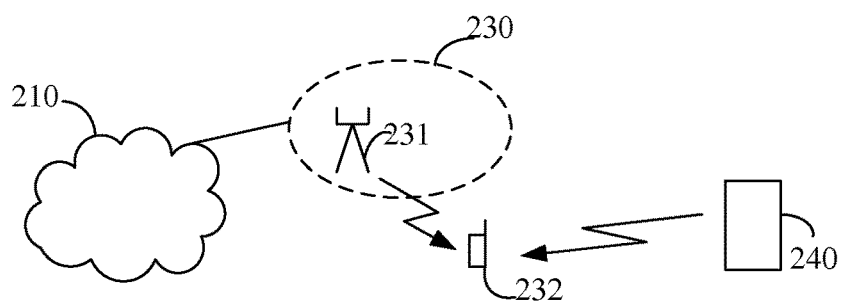
Figure 2C:
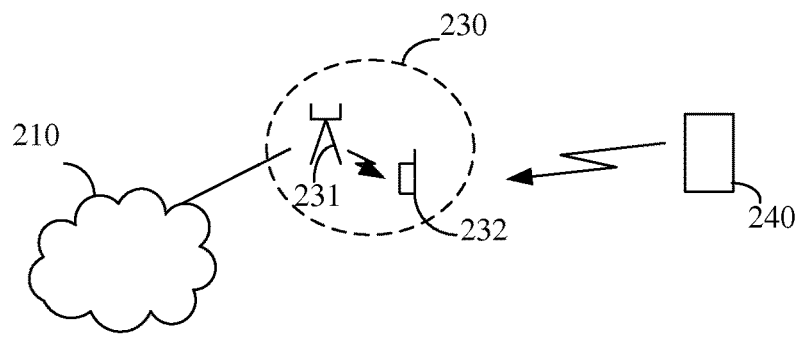

Typical example scenarios according to the above are illustrated in FIGS. 2A-2C. In FIGS. 2A-2C, like numbers refers to like entities unless explicitly stated otherwise.

FIG. 2A illustrates a wireless communication network according to some embodiments. The wireless communication network may be associated with a network cloud 210. The network cloud 210 may e.g. comprise radio functional managers (not shown) and be connected to a core network or a remote server (not shown).

Two access nodes 221 and 231 are operatively connected to and communicate with the network cloud 210.

The access nodes 221, 231 may e.g. be the access node as described in conjunction with FIG. 1.

Two network areas 220 and 230 are respectively associated with the access nodes 221 and 231. The network areas 220, 230 may e.g. be comprised in network cells associated with the access nodes. In some embodiments, the network areas 220, 230 may be network cells.

In this particular example, two communication devices 222 and 232 have respectively entered the network areas 220 and 230.

The communication devices 222, 232 may e.g. be the communication device as described in conjunction with FIG. 1.

It should be noted that other network configurations are of course possible, the network cloud may e.g. be associated with fewer or more access nodes, and several communication devices may be present in the network, both stationary and mobile.

Various scenarios are now imaginable according to some embodiments. For instance, the communication device 222 may receive a first data packet comprising a write request from the access node 221 and shortly thereafter also receive a second data packet comprising an identifier associated with the first write request and the access node (compare with the method 100).

When extracting the identifier, the communication device 222 may determine that the identifier is trusted, but that it may not validly receive updates from this particular access node. This may e.g. be determined if the identifier is a signed authentication location message validly singed by the access node, but is not comprised in the communications device's 222 set of pre-determined identifiers.

Hence the communication device is not allowed to accept write requests from this particular access node 221, even though it is considered a trusted source.

In the same manner, communication device 232 has received from the access node 231 a first data packet comprising a write request and a second data packet comprising an identifier associated with the first data packet and the access node 231.

The communication device 232 may further have determined that the identifier is trusted and is a valid identifier (e.g. by verifying that it is comprised in the device's 232 set of pre-determined identifiers), and may hence accept the write request, or at least a subset of the write request.

In some scenarios it may be assumed that memory write operations are only valid for a geographical area exemplary denoted as area "C" (the letter C not shown in the Figures), but neither the remote server associated with the cloud 210 nor the device applications processor comprised in the communication devices 222 and 232 may know the position C. In the scenario of FIG. 2A it may e.g. be either of the areas 220 and 230 that is the area C.

The server may thus send reconfiguration request to "all" devices (222 and 232 in this example).

An explicit example applicable on FIG. 2A is an IoT device (communication device) associated with transportation of goods which may only be updated in-between transports. The SW configuration may be related to the specific goods and the IoT-device may be associated to, e.g., a thermometer reporting temperature periodically, where the periodicity depends on the sensitivity or price of the goods or transportation quality of service purchased by the customer.

The IoT device may then upon reception of the write request verify whether the write is trusted and valid, by verifying the identifier received in the second data packet and associated with the communication to the AP/NW node (e.g. by means of the method 100). In this example, the reconfiguration is accepted for device 232 communicating with access node 231 (being in area "C"), while denied in device 222, communicating to access node 221 in cell 220.

In another example, the IoT device may only be allowed to make such memory write operations when associated with a certain kind of network, e.g., a cellular network, whereas a wireless LAN network may be determined to be too easily manipulated for such operations.

Hence, the write request may further be associated with certain requirements as to where the update may be accepted. Hence prior to accepting the write request, the communication device 232 may also be required to determine whether it actually is located in a location where the write request may be accepted, either in part of in full.

This is illustrated in FIG. 2B. In FIG. 2B, the communication device 232 is located outside the network area 230 but may still receive transmissions from the access node 231. The communication device 232 may also receive transmission from an unknown user or entity 240. The entity 240 may e.g. be an entity attempting to hack or subject the communication device with malicious software.

In one scenario, the communication device 232 may have received a first data packet comprising a write request, but no second packet comprising an identifier associated with the first packet is received. The first packet may e.g. have originated from the entity 240 and it may not be aware that an identifier is needed. Hence, the communication device 232 may discard the write request, and possibly report that a write request was received but rejected to e.g. the access node 231 or a remote server associated with the cloud 210 (compare with the method 100).

In some embodiments, the communication device may refrain from reporting a rejected write request which was rejected due to missing or erroneous identifier (i.e. not trusted) since it may reveal to the potential hacker that it has been detected. The report could e.g. be saved and later transmitted in a secure area, if transmitted at all.

In another scenario, the wireless device may have received a first data packet comprising a write request, and a second data packet comprising an identifier being associated with the first data packet.

When determining whether the identifier is trusted and valid (e.g. by performing the method 100), the communication device may discover that the write request originates from the access node 231, which is a trusted node, and that the communication device may accept updates from the access node 231.

However, when receiving the first packet the communication device may have also received information pertaining to on what locations this particular write request may be accepted.

The communication device may then also validate that it may accept the write request issued by the access node 231 in a certain location based on the information comprised in the first data packet together with information associated with the signed authentication location message.

The communication device 232 may thus determine a current location of the communication device based on the signed authentication message. In the example scenario of FIG. 2B, the write request may only be accepted within the network area 230 and since the communication device 232 is located outside the network area 230, it will discard the request and possibly report the failed write request.

In some embodiments, the communication device may, if the identifier is trusted and validated, save the write request during a period of time (such as hours, days or weeks) until it finds itself in a location where it may accept the write request.

FIG. 2C illustrates an example scenario similar to that of FIG. 2B but where the communication device 232 is located within the network area 230 instead of outside it. If in this scenario the communication device receives a first data packet comprising a write request which may be carried out in the cell 230 if received by the access node 231, and a second data packet comprising an identifier associated with the first packet, the write request may be accepted if the identifier is determined to be trusted and valid (e.g. as previously explained in conjunction with either of the previous figures).

In some embodiments, it may also be determined wither the identifier enables acceptance of at least a sub set of the write request in the location associated with the information comprised in the write request. Hence in some embodiments it may be determined based on the identifier whether the write request may be accepted in its entirety or whether at least a subset of the write request may be accepted.

In some scenarios the communication device may receive a request from e.g. a remote server node (or access node) which if accepted results in a memory write request by the communication device's applications processor. In some embodiments, the memory write request may be an application layer SW installation or upgrade or a firmware upgrade.

In some embodiments, the memory write request may be related to configuration data of the communication device. The device then determines an identifier associated to the serving/camping NW node/AP. The identifier may be the global/local cell ID, AP ID, or RAT used in the connection. In some embodiments it may be specifically crafted location messages, signed by the NW node/AP using well know methods for message signing.

The communication device then verifies the connection, for instance by comparing the identifier towards allowed/trusted/valid identifiers in a data base (that may be stored beforehand, in the device).

In some embodiments, different parameter memory write operations may have different data bases, and hence one subset of the memory write operations may be allowed for some AP/NW nodes, while another subset may not.

If the verification at least partly is acknowledged (it may e.g. be that the communication device is allowed to accept part of the write request from the access node which issued the request and identifier), the device accepts the reconfiguration request and performs the reconfiguration.

In some embodiments, as mentioned above, the verification may only be acknowledged for a subset of the parameters/objects in the reconfiguration request, and then only the acknowledged parts of the reconfiguration are performed.

In some embodiments, also the connection properties or geographical location, or in short, an identifier, of the server/unit sending the reconfiguration request is included in the verification performed by the communication device by e.g. transmitting such parameters in the request. Hence, in some embodiments, the connection for both the device and the node requesting the reconfiguration needs to be trusted and valid.

Hence in some embodiments, the identifier comprises a connection identifier, wherein the connection identifier is associated with a transmitter of the write request and wherein determining whether the identifier is trusted further comprises determining whether the connection identifier is trusted.

Some embodiments comprise a method of an access node associated with a wireless communication network and configured to operate in connection with a communication device.

Figure 3:
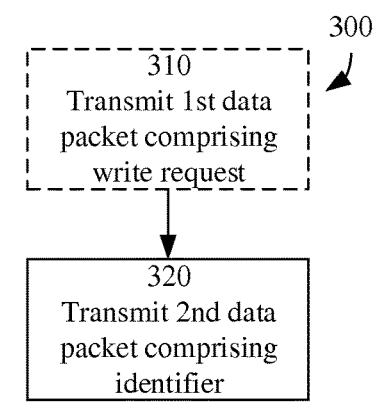
FIG. 3 is a flowchart illustrating example method steps according to some embodiments.

Such a method 300 is illustrated in FIG. 3.

The access node may e.g. be the access node as described in conjunction with any of the previous figures. In some embodiments, the access node is an access point, a network node, a base station, an eNB, a network cell, a remote server, a core network etc.

The method 300 starts in step 310 with transmitting a first data packet comprising a write request for writing code to a non-volatile memory comprised in the communication device (compare with step 110 of the method 100).

Then in step 320 the method comprises transmitting a second data packet within a predetermined time period of transmitting the first data packet, wherein the second data packet comprises an identifier associated with the first data packet, wherein the identifier is a radio access layer parameter (compare with step 120 of the method 100).

In some embodiments, the second data packet may be transmitted prior to the first data packet. In some embodiments, the first and second data packet may be transmitted in a single data packet.

In some embodiments, the identifier further comprises information associating the identifier with the access node and a signed authentication location message comprising a signature of the access node.

In some embodiments, the method 300 may be carried out by different network entities. The step 310 may e.g. be carried out by a remote server (as illustrated with the dotted line, this box may be optional for an access node), and the step 320 may be carried out by the access node.

In some embodiments, the steps 310 and 320 may be combined into one step, i.e. the first and second data packet may be transmitted as one data packet.

Figure 4:
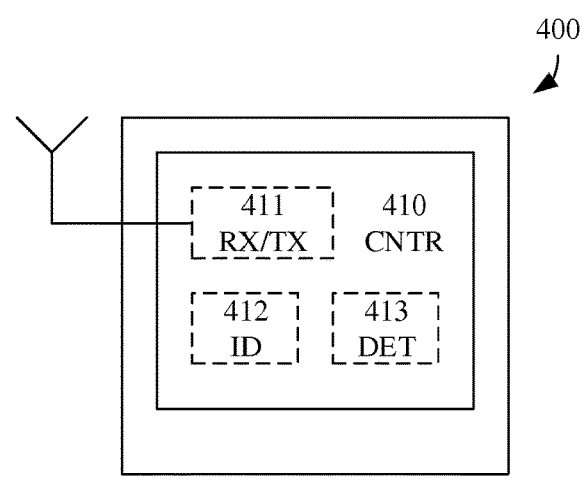
FIG. 4 is a block diagram illustrating an example arrangement according to some embodiments.

FIG. 4 illustrates an example arrangement 400 for a communication device according to some embodiments. The communication device may e.g. be the communication device as described in conjunction with any of the previous figures.

The communication device may be configured to operate in connection with an access node associated with a wireless communication network.

The access node and wireless communication device may e.g. be the access node and wireless communication device described in conjunction with any of the previous figures.

The arrangement 400 comprises a controlling circuitry (CNTR) 410. The controlling circuitry may further comprise or be associated with a transceiver (RX/TX) 411 comprising circuitry for transmitting and receiving signals. In some embodiments the controlling circuitry 410 may further comprise an identifier extractor (ID) 412 comprising circuitry configured to extract an identifier from received data packets. In some embodiments, the controlling circuitry 410 may further comprise a determiner (DET) 413 configured to determine whether the write request may be accepted.

In some embodiments, the controlling circuitry 410 is configured to cause (e.g. by causing the transceiver 411 to receive) reception of a first data packet comprising a write request for writing code and/or data to a non-volatile memory comprised in the communication device (compare with step 110 of the method 100).

The controlling circuitry may also be configured to cause determination of whether a second data packet comprising an identifier associated with the first data packet is received (e.g. by causing the determiner 413) (compare with step 120 of the method 100).

The second data packet may e.g. integrated within the first data packet, or it may have been received prior to the first data packet or after the first data packet.

Hence, in some embodiments, the controlling circuitry 410 is configured to cause reception of the first data packet and second data packet simultaneously in one data packet.

When it is determined that the second data packet comprising the identifier is received, the controlling circuitry 410 is further configured to cause extraction of the identifier from the second data packet (e.g. by causing the identifier extractor 412), wherein the identifier is a radio access layer parameter (compare with step 130 of the method 100).

The controlling circuitry 410 may further be configured to cause determination of whether the identifier is trusted (e.g. by causing the determiner 413), cause determination of whether the identifier is validated when it is determined that the identifier is trusted and cause acceptance of at least a subset of the write request when it is determined that the identifier is trusted and validated (compare with step 140 of the method 100).

In some embodiment the controlling circuitry 410 is configured to cause the determination of whether the identifier is associated with at least one of a serving cell, a camping cell, an access point and a network node (e.g. by causing the determiner 413).

In some embodiments, the controlling circuitry 410 is configured to cause determination of whether the identifier is trusted by causing determination of whether the identifier is a signed authentication location message with a valid signature (e.g. by causing the determiner 413).

In some embodiments, the controlling circuitry 410 is configured to cause determination of whether the identifier is validated by causing determination of whether the identifier is comprised in a set of pre-determined identifiers (e.g. by causing the determiner 413).

The set of pre-determined identifiers may e.g. be comprised in a list which is stored internally on the communication device in a data base or memory (not shown in FIG. 4).

In some embodiments, the authentication location message is signed by at least one of the access node, a network node, an access point and a mobile operator core network.

In some embodiments, the controlling circuitry 410 is further configured to cause determination of a current location of the communication device based on the signed authentication location message and determination of whether the write request may be accepted in the location associated with the signed authentication location message (e.g. by causing the determiner 413).

In some embodiments, the controlling circuitry 410 is further configured to cause, when it is determined that the second data packet comprising the identifier associated with the first data packet is not received, determination of whether a pre-determined time period has expired since the first data packet was received.

When it is determined that the pre-determined time period since the first data packet was received has expired, the controlling circuitry is configured to cause refusal of the write request (compare with step 170 of the method 100).

In some embodiments, the first data packet further comprises information associated with a location where the write request can be accepted.

In some embodiments, the controlling circuitry 410 is further configured to cause determination of whether the identifier enables acceptance of at least a sub set of the write request in the location associated with the information comprised in the write request.

In some embodiments, the controlling circuitry 410 is further configured to cause performance of the determination of whether the identifier is trusted in at least one of a trusted execution environment and a modem processor of the wireless communication device.

In some embodiments, the write request comprises a set of memory write parameters.

In some embodiments, the set of memory write parameters is associated with at least one of a software program memory, a firmware program memory, a software configuration memory, and firmware configuration memory.

In some embodiments, the identifier comprises a connection identifier, wherein the connection identifier is associated with a transmitter of the write request and wherein the controlling circuitry 410 is configured to cause determination of whether the identifier is trusted further by causing determination of whether the connection identifier is trusted (e.g. y causing the determiner 413).

In some embodiments, the controlling circuitry 410 is configured to cause determination based on the identifier of whether the write request may be accepted in its entirety or whether at least a subset of the write request may be accepted.

In some embodiments, wherein when it is determined that the identifier is not trusted, the controlling circuitry 410 is configured to cause rejection of the write request.

In some embodiments, the controlling circuitry 410 is further configured to cause reporting of the rejection of the write request to at least one of the access node or a remote server node (compare with step 180 of the method 100).

In some embodiments, the arrangement 400 may be comprised in a communication device such as described in conjunction with any of the previous figures. The arrangement 300 may further be configured to carry out the method 100.

Figure 5:
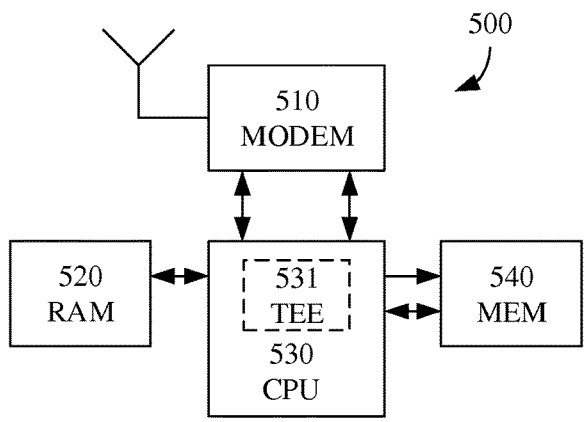
FIG. 5 is a block diagram illustrating an example arrangement according to some embodiments.

FIG. 5 illustrates an example arrangement 500 of a communication device according to some embodiments. The arrangement 500 may e.g. be combined or comprised within the arrangement 400, and may be configured to carry out the method as described in conjunction with FIG. 1.

The arrangement 500 comprises a modem (MODEM) 510 comprising or being associated with circuitry for receiving and transmitting signals (compare with RX/TX of the arrangement 400).

The arrangement 500 may further comprise a computer processing unit (CPU) 530 which further may comprise or be associated with a trusted execution environment (TEE) 531.

The arrangement 500 may also comprise a volatile memory, (RAM) 520 such as a random access memory and a non-volatile memory (MEM) 540.

The CPU 530 may e.g. be controlling circuitry 410 of the arrangement 400.

Figure 6:
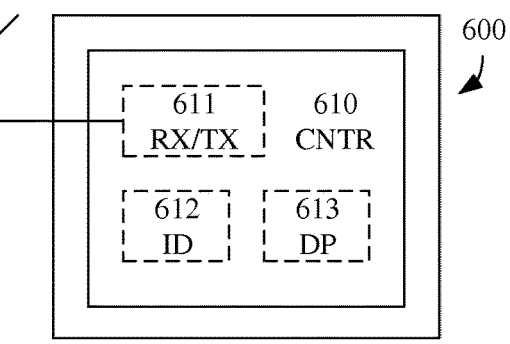
FIG. 6 is a block diagram illustrating an example arrangement according to some embodiments.

FIG. 6 illustrates an arrangement 600 of an access node according to some embodiments.

The access node may e.g. be the access node as described in conjunction with any of the FIGS. 1-3.

The access node may be associated with a wireless communication network and configured to operate in connection with a communication device.

The communication device may e.g. be communication device as described in conjunction with any of the previous Figures.

The wireless network may e.g. be the wireless network described in conjunction with any of the FIGS. 1-3.

The arrangement 600 may comprise controlling circuitry (CNTR) 610. The controlling circuitry 610 may further comprise or be associated with a transceiver (RX/TX) 611 configured to transmit and receive signals, an authorizer (ID) 612 configured to add identifier(s) associated with the access node and issued write requests to data packets for transmission, and a data packet module (DP) 613 configured to create data packets for transmission.

In some embodiments, the controlling circuitry 610 may be configured to cause transmittal of a first data packet comprising a write request for writing code to a non-volatile memory comprised in the communication device (e.g. by causing the DP 613 to create a data packet and the transceiver 611 to transmit the data packet) (compare with step 310 of the method 300).

In some embodiments, the controlling circuitry 610 may be configured to cause transmittal of a second data packet within a predetermined time period of transmitting the first data packet, wherein the second data packet comprises an identifier associated with the first data packet, wherein the identifier is a radio access layer parameter (compare with step 320 of the method 300).

In some embodiments, the controlling circuitry 610 is further configured to cause association of the identifier with information associating the identifier with the access node and a signed authentication location message comprising a signature of the access node (e.g. by causing the authorizer 612).

In some embodiments, the arrangement 600 may be comprised in an access node.

In some embodiments, the access node may e.g. be any of the access node described in conjunction with any of the previous figures.

In some embodiments, the arrangement 600 is comprised in a remote server.

With the embodiments disclosed herein it is possible to block memory write operations in a restricted memory space, e.g., in an application of firmware program space, to only be allowed in a trusted environment or location, e.g., a trusted RAT, NW node, cell, or AP, and thereby reducing the risk of malicious code entering the device permanently or in an uncontrollable way. Should malicious code still manage to enter the device in another address space, the trusted address space will allow for flushing the malicious code in a simple way since it may be deleted at reboot.

Hence security is enhanced in a wireless communication network serving devices such as e.g. IoT-devices.

Subsequently, according to some embodiments, IoT-devices in wireless communication networks will be better protected against malicious attacks than they are today.

FIG. 7 illustrates a computer program product comprising a non-transitory computer readable medium 700, wherein the non-transitory computer readable medium 700 has stored there on a computer program comprising program instructions. The computer program is configured to be loadable into a data-processing unit 710, comprising a processor (PROC) 730 and a memory (MEM) 720 associated with or integral to the data-processing unit. When loaded into the data-processing unit 710, the computer program is configured to be stored in the memory 720, wherein the computer program, when loaded into and run by the processor 730 is configured to cause the processor to execute method steps according to any of the methods described herein e.g. the method 100 and 300.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely for illustrative purpose and by no means limiting. Instead, all variations that fall within the range of the claims are intended to be embraced therein.

The invention claimed is:

1. An arrangement for a communication device, the communication device is configured to operate in connection with an access node associated with a wireless communication network, and the arrangement comprises controlling circuitry configured to cause:

reception of a first data packet comprising a write request for writing at least one of code and data to a non-volatile memory comprised in the communication device; and determination of whether a second data packet comprising an identifier associated with the first data packet is received;

when it is determined that the second data packet comprising the identifier is received, the controlling circuitry is further configured to cause:

extraction of the identifier from the second data packet, the identifier is a radio access layer parameter that comprises a connection identifier associated with a transmitter of the write request;

determination of whether the identifier is trusted by determining whether the connection identifier is trusted;

determination of whether the identifier is validated when it is determined that the identifier is trusted by determining whether the identifier, which is the radio access layer parameter that comprises the connection identifier associated with the transmitter of the write request is comprised in a set of pre-determined identifiers; and acceptance of at least a subset of the write request when it is determined that the identifier is trusted and validated; and when it is determined that the second data packet comprising the identifier associated with the first data packet is not received, the controlling circuitry is further configured to cause determination of whether a pre-determined time period has expired since the first data packet was received, the pre-determined time period is determined based on a purpose of the communication device in the wireless communication network, when the purpose of the communication device is important or critical, a shorter time period is set for the pre-determined time period compared to a duration of the predetermined time period set when the purpose of the communication device is unimportant or noncritical; and determination of whether the pre-determined time period since the first data packet was received has expired, and when it is determined that the pre-determined time period since the first data packet was received has expired the controlling circuitry is further configured to cause refusal of the write request.

2. The arrangement according to claim 1, wherein the controlling circuitry is configured to cause reception of the first data packet and the second data packet simultaneously in one data packet.

3. The arrangement according to claim 1, wherein the controlling circuitry is configured to cause determining of whether the identifier is trusted by causing:
   determination of whether the identifier is a signed authentication location message with a valid signature.

4. The arrangement according to claim 3, wherein the controlling circuitry is further configured to cause:
   determination of a current location of the communication device based on the signed authentication location message; and
   determination of whether the write request may be accepted in a location associated with the signed authentication location message.

5. The arrangement according to claim 1, wherein the first data packet further comprises information associated with a location where the write request can be accepted.

6. The arrangement according to claim 1, wherein the controlling circuitry is further configured to cause performance of the determination of whether the identifier is trusted in at least one of a trusted execution environment and a modem processor of the communication device.

7. The arrangement according to claim 1, wherein the controlling circuitry is configured to cause:
   determination based on the identifier of whether the write request may be accepted in its entirety or whether at least the subset of the write request may be accepted.

8. A method of a communication device, the communication device is configured to operate in connection with an access node associated with a wireless communication network, and the method comprises:
   receiving a first data packet comprising a write request for writing at least one of code and data to a non-volatile memory comprised in the communication device; and
   determining whether a second data packet comprising an identifier associated with the first data packet is received;
   when it is determined that the second data packet comprising the identifier is received the method further comprises:
      extracting the identifier from the second data packet, the identifier is a radio access layer parameter that comprising a connection identifier associated with a transmitter of the write request;
      determining whether the identifier is trusted by determining whether the connection identifier is trusted;
      determining whether the identifier is validated when it is determined that the identifier is trusted by determining whether the identifier, which is the radio access layer parameter that comprises the connection identifier associated with the transmitter of the write request, is comprised in a set of pre-determined identifiers; and
      accepting at least a subset of the write request when it is determined that the identifier is trusted and validated; and
   when it is determined that the second data packet comprising the identifier associated with the first data packet is not received, the method further comprises:
      determining whether a pre-determined time period has expired since the first data packet was received, the predetermined time period is determined based on a purpose of the communication device in the wireless communication network, when the purpose of the communication device is important or critical, setting a shorter time period for the pre-determined time period compare to a duration of the pre-determined time period set when the purpose of the communication device is unimportant or noncritical; and
   determining whether the pre-determined time period since the first data packet was received has expired, and when it is determined that the pre-determined time period since the first data packet was received has expired, refusing of the write request.

9. The method according to claim 8, wherein the first data packet and the second data packet is received simultaneously in one data packet.

\* \* \* \* \*